(No Model.)
J. W. McDONOUGH.
MULTICOLORED SCREEN.
No. 561,686. Patented June 9, 1896.
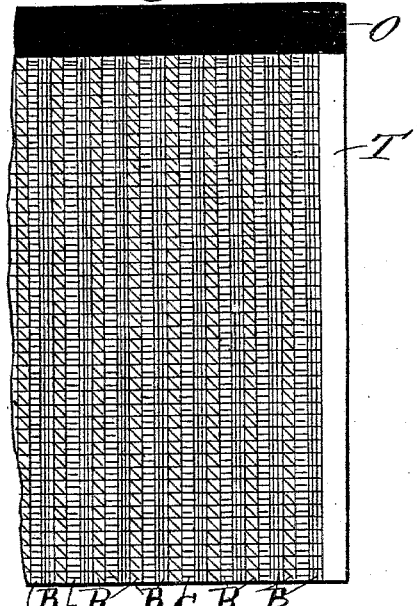
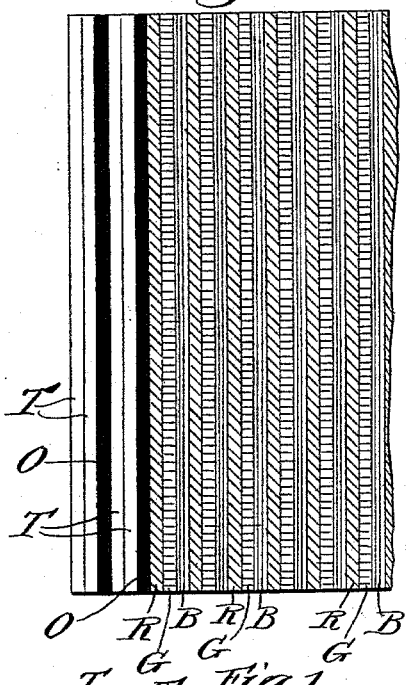
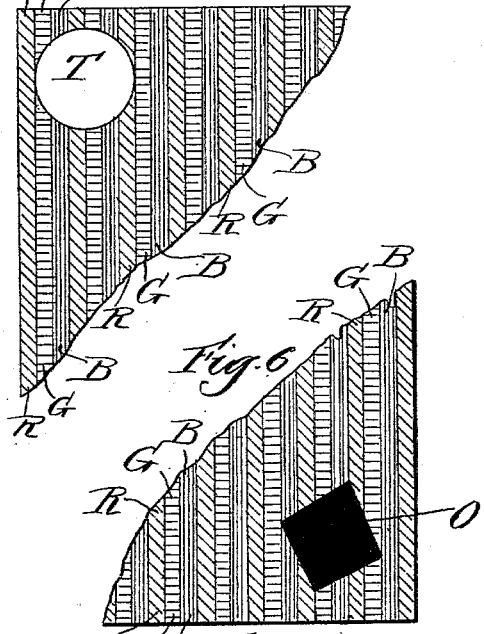
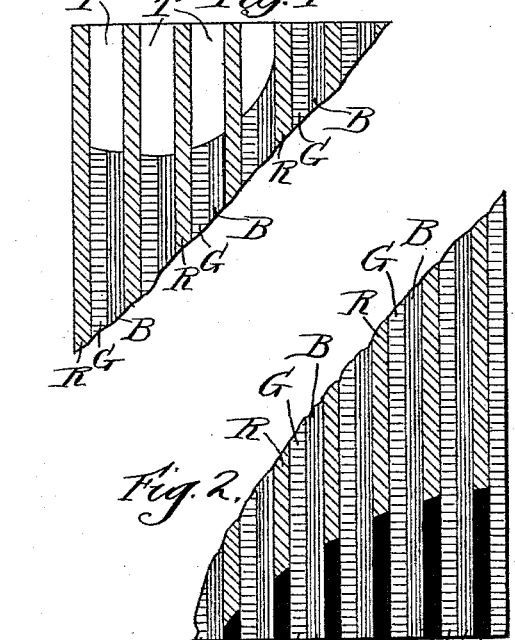
Witnesses:
Wm. M. Rheem
Wm. F. Henning
Inventor
James W. McDonough
By Banning & Banning & Sheridan,
Attorneys.
ANDREW B.GRAHAM. PHOTO-LITHO. WASHINGTON,D.C.

UNITED STATES PATENT OFFICE.

JAMES W. McDONOUGH, OF CHICAGO, ILLINOIS.

MULTICOLORED SCREEN.

SPECIFICATION forming part of Letters Patent No. 561,686, dated June 9, 1896.

Application filed September 18, 1895. Serial No. 562,893. (No model.)

*To all whom it may concern:*

Be it known that I, JAMES W. McDONOUGH, a citizen of the United States, residing at Chicago, Illinois, have invented certain new and useful Improvements in Multicolored Screens, of which the following is a specification.

The object of my present invention is to make a multicolored screen or plate for use in obtaining photographs in colors, and more particularly to aid in registering the lines or patterns of multicolored paper or other material with the lines, dots, or patterns of a positive or negative made by the action of light in alternating patterns to correspond in register with such paper or material.

In the drawings the various figures represent plan views of portions of the multicolored screens to be hereinafter described.

In carrying out or effecting my process for producing colored pictures by the aid of photography I make a screen or plate by ruling, printing, or placing upon the plate of glass, mica, celluloid, or other suitable material figures—as lines, dots, patterns—which are microscopic in size—say three hundred in width to the inch—and in alternating different transparent colors—say one R of yellowish red, one G of yellowish green, and one B of violet-blue, or their complementaries—or the entire range of spectrum colors may be used, if preferred. This screen is further treated by continuing the red or other line beyond the others, which are arrested in some particular place, as shown by T in Figure 1, which shows a section of the lines upon a screen, or the red line may be made opaque by ruling or printing over it another line in a patch or patches, as shown by O in Fig. 2, or the red line may be opaqued and the others left blank and transparent, as shown by O and T in Fig. 3, where the registering lines are continued the entire length of one or both sides or on the ends and sides, as preferred. These registering lines may be confined to one pattern or may cover a certain space, such as half an inch. In case half an inch were covered fifty red lines would be opaqued where they were arranged at three hundred to the inch. Fig. 4 shows an opaque portion O extending across the end and a transparent or blank space T extending along one side. Of course any other colored line or lines than the red may be opaqued or left transparent and blank. This opaquing also may be extended over several lines in a patch or patches, as shown by O in Fig. 6, or be confined to a single line, or a hole perforated, or a bare spot or line left in the screen, as shown by T in Fig. 5. Where patches are used, it is, I think, advisable to have them on more than one corner of the screen or extended the entire length of one side. It will be noticed that in all these opaqued or transparent lines or patches the markings point out or bring to view some single line of the colors for the purpose of registration. In the screen the lines, dots, or figures of different colors are so fine that they are not distinguishable with the naked eye, and it is necessary to distinguish by some mark or definite characteristic the color on the screen, so that the mark or means for distinguishing the line or lines shall be impressed on the negative which has no color. In Figs. 1, 2, and 3, for example, the red lines R are selected or pointed out, and when a screen like that shown in these figures is used a negative is obtained which, when placed over paper ruled to correspond in color and register with the screen used, causes a series of blue and green lines to be hidden and a strip of red lines to be exposed to view, which, by its extent—say one-half inch wide by the length of the screen—presents a broad line of pure red. If, however, the negative and paper are not in register, a series of colors are exposed containing the other colors of the spectrum, which show that a true registry has not been obtained. In Fig. 4, to further illustrate, a broad transparent band T marks a line of color B, or an opaque band O marks a black cross-line of the screen, depending upon which of these means of registry is used. In Fig. 5 the transparent circle T points out or marks a line R on the left-hand side and a line G on the right-hand side. In Fig. 6 the opaque diamond O points to a line G on the left-hand side and a line B on the right-hand side, and its four corners make a separation of the lines R, G, R, and B. It will thus be seen that, as above suggested, the transparent or opaque lines or patches, as shown in the drawings, point out certain single lines of the colors and thus facilitate the securing of proper registration. In all these cases where there is a transparent or opaqued line or pattern, patch, or hole such portion forms a fixed or invariable and distinctive characteristic or peculiarity, which is reproduced in the sensitive material applied to the screen, and which serves as a guide or mark to determine the position of the parts in effecting registration thereafter.

The screen is placed in front of the photographic sensitive plate in such manner that the image of the object to be photographed shall pass through the screen before reaching and impressing itself on the sensitive plate. Clear, transparent, colorless lines on the registering portion of the screen will allow any color to pass through. Opaque lines or patterns will cut off all light and a corresponding registering portion will show on the negative when developed. This registering portion of the screen may be detached and again united or placed permanently in the camera to be used in combination with the multicolored screen.

What I regard as new, and desire to secure by Letters Patent, is—

1. A screen or plate for photographic purposes provided with colored substances arranged according to regular recurring patterns—as dots, lines, figures—and having a portion where there is a fixed or invariable and distinctive characteristic which is reproduced in the sensitive material applied to it, by which such material may thereafter be registered or adjusted in position in use.

2. A screen or plate for photographic purposes provided with colored substances arranged according to regular recurring patterns—as dots, lines, figures—and having a portion or portions where one line or pattern is opaqued or printed over.

3. A screen or plate for photographic purposes provided with colored substances arranged according to regular recurring patterns—as dots, lines, figures—and having a portion where a line or pattern of one color is opaqued and others of other color transparent and clear.

4. A screen or plate for photographic purposes provided with colored substances arranged according to regular recurring patterns—as dots, lines, figures—and having a portion where a line or pattern is transparent and clear and others of other color opaqued.

5. A screen or plate for photographic purposes provided with colored substances arranged according to regular recurring patterns—as dots, lines, figures—and having a portion or portions where all lines are transparent and colorless.

6. A screen or plate for photographic purposes provided with colored substances arranged according to regular recurring patterns—as dots, lines, figures—and having a portion or portions where all lines are spotted or opaqued.

7. A screen or plate for photographic purposes provided with colored substances arranged according to regular recurring patterns—as dots, lines, figures—and having a portion or portions where one line or pattern is extended beyond the others.

8. A screen or plate for photographic purposes provided with colored substances arranged according to regular recurring patterns—as dots, lines, figures—in combination with a screen for registering purposes having transparent and opaque lines or patterns corresponding in register, size and alternation with the lines or patterns of the multicolored screen.

JAMES W. McDONOUGH.

Witnesses:
   THOMAS A. BANNING,
   THOMAS B. McGREGOR.